United States Patent
Lowman et al.

(10) Patent No.: US 7,880,924 B2
(45) Date of Patent: Feb. 1, 2011

(54) METHOD FOR FAXING DOCUMENTS PRINTED ON COLORED MEDIA

(76) Inventors: Brad Lowman, 11311 Chinden Blvd., Boise, ID (US) 83714-0021; Lance Binder, 11311 Chinden Blvd., Boise, ID (US) 83714-0021; Andy Smith, 11311 Chinden Blvd., Boise, ID (US) 83714-0021

( * ) Notice: Subject to any disclaimer, the term of this patent is extended or adjusted under 35 U.S.C. 154(b) by 1169 days.

(21) Appl. No.: 10/977,924

(22) Filed: Oct. 28, 2004

(65) Prior Publication Data

US 2006/0092483 A1    May 4, 2006

(51) Int. Cl.
G06F 15/00 (2006.01)
G06K 1/00 (2006.01)
H04N 1/46 (2006.01)

(52) U.S. Cl. .................. 358/1.9; 358/500; 358/464

(58) Field of Classification Search .................. 358/1.1, 358/1.9, 400, 401, 464, 500, 501
See application file for complete search history.

(56) References Cited

U.S. PATENT DOCUMENTS

| | | | |
|---|---|---|---|
| 5,289,296 | A | 2/1994 | Yamada et al. |
| 5,706,368 | A | 1/1998 | Mita et al. |
| 2002/0159080 | A1 | 10/2002 | Feng et al. |
| 2004/0207882 | A1* | 10/2004 | Ahmed et al. .............. 358/3.26 |

OTHER PUBLICATIONS

European Search Report dated Mar. 2, 2006.

* cited by examiner

*Primary Examiner*—Thomas D Lee

(57) ABSTRACT

Methods of detecting and compensating for colored media when utilizing the facsimile send function of an All-in-One printing system are disclosed. Embodiments include obtaining a color scan of the document page, determining an approximate value for the background color of the document page, and adjusting the scanned image of the document page to substantially eliminate the background color.

14 Claims, 6 Drawing Sheets

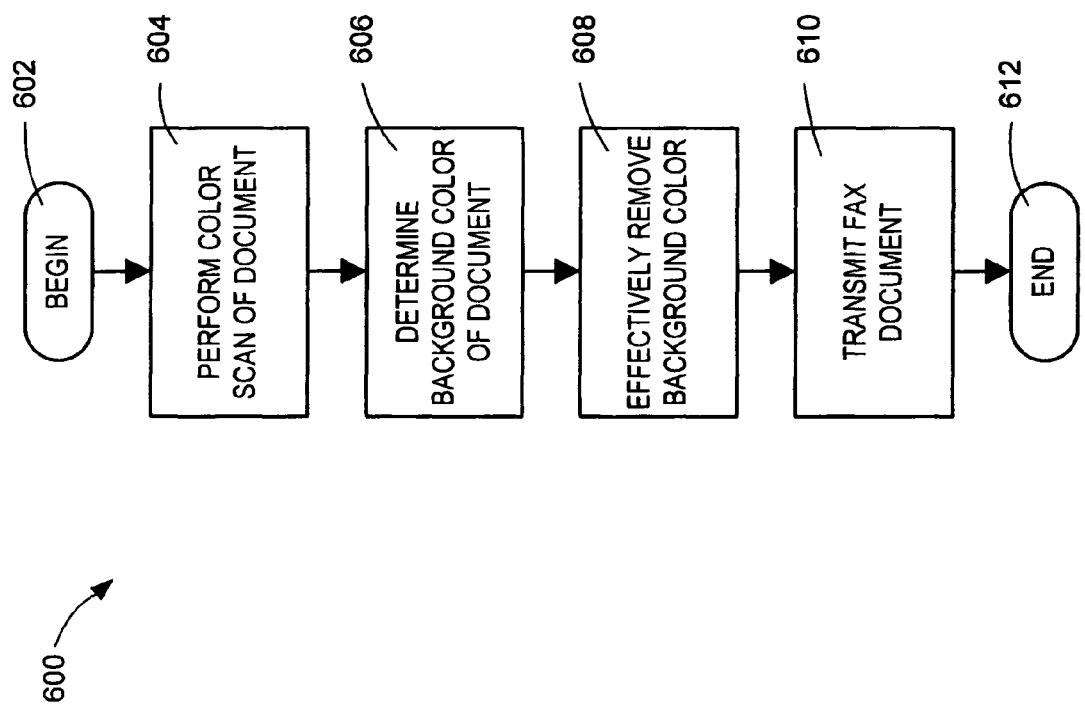

METHOD FOR FAXING DOCUMENTS PRINTED ON COLORED MEDIA

FIELD OF INVENTION

The present disclosure relates generally to methods for facsimile transmission of documents, and more particularly to methods of utilizing the capabilities of multifunction printing systems to improve the readability of faxed documents.

BACKGROUND

Printing systems, including inkjet and laser printers, are well known in the art. In inkjet printing systems, an inkjet printhead is typically mounted on a carriage that is moved back and forth across a print media, such as paper. As the printhead is moved across the print media, a control system activates the printhead to deposit or eject ink droplets onto the print media to form text and images. Ink is provided to the printhead from a supply of ink that is either carried by the carriage or mounted to a fixed receiving station.

In electrophotographic or "laser" printing systems, marking material commonly called "toner" is provided by an electrophotographic engine frequently referred to as a toner cartridge. The toner cartridge often includes an intermediate imaging device such as a drum, and a reservoir of imaging material such as powdered toner. The drum is charged using an energy source such as a scanning laser. The imaging material is attracted to the charged drum and is then transferred to print media.

Regardless of the printing technology, it has become common for printing systems to incorporate additional functionality, generally by the inclusion of a scanner. These multifunction or "All-in-One" systems allow a user to print, scan, copy, and fax documents. The desired function may typically be selected from a control panel on the printing system, or through a software menu structure. Typical control panels may comprise hard-wired buttons or controls, or may comprise liquid crystal displays (LCDs) that may or may not be touch-sensitive (in which case they may be referred to as touchscreens). Such displays normally provide graphical representations of various selectable features, for instance buttons, that the user may select by either touching the display with one's finger or scrolling through the features using an actual control panel button.

One common function provided by All-in-One printing systems is facsimile transmission, or "fax". Fax is a relatively old technology in which the image on a sheet of paper is scanned and converted into audio tones that may be transmitted over common telephone lines. The low bandwidth of phone lines means that faxes are typically low resolution monochrome images.

Facsimile transmission works reasonably well when the original document consists of dark lines or text on a substantially white background. Facsimile transmission works much less well when the original document has characteristics that don't reproduce well as a low resolution monochrome image. When the original document is printed on colored paper, for example, artifacts in the background of the faxed image can seriously degrade the readability of the faxed document.

There is therefore a need for methods that allow for improved facsimile transmission of documents printed on color media.

SUMMARY

Exemplary embodiments of the invention include methods of detecting and compensating for colored media when utilizing the facsimile send function of an All-in-One printing system. Embodiments include obtaining a color scan of the document page, determining an approximate value for the background color of the document page, and adjusting the scanned image of the document page to substantially eliminate the background color.

Other aspects and advantages of the present invention will become apparent from the following detailed description, taken in conjunction with the accompanying drawings, illustrating by way of example the principles of the invention.

BRIEF DESCRIPTION OF THE DRAWINGS

The invention can be better understood with reference to the following drawings. The components in the drawings are not necessarily to scale.

FIG. 6 is a flow diagram illustrating an embodiment of the invention.

DETAILED DESCRIPTION

Embodiments of the invention are described with respect to an exemplary printing system; however, the invention is not limited to the exemplary system, but may be utilized in other systems.

In the following specification, for purposes of explanation, specific details are set forth in order to provide an understanding of the present invention. It will be apparent to one skilled in the art, however, that the present invention may be practiced without these specific details. Reference in the specification to "one embodiment" or "an exemplary embodiment" means that a particular feature, structure, or characteristic described in connection with the embodiment is included in at least one embodiment. The appearance of the phrase "in one embodiment" in various places in the specification do not necessarily refer to the same embodiment.

Figure 1:
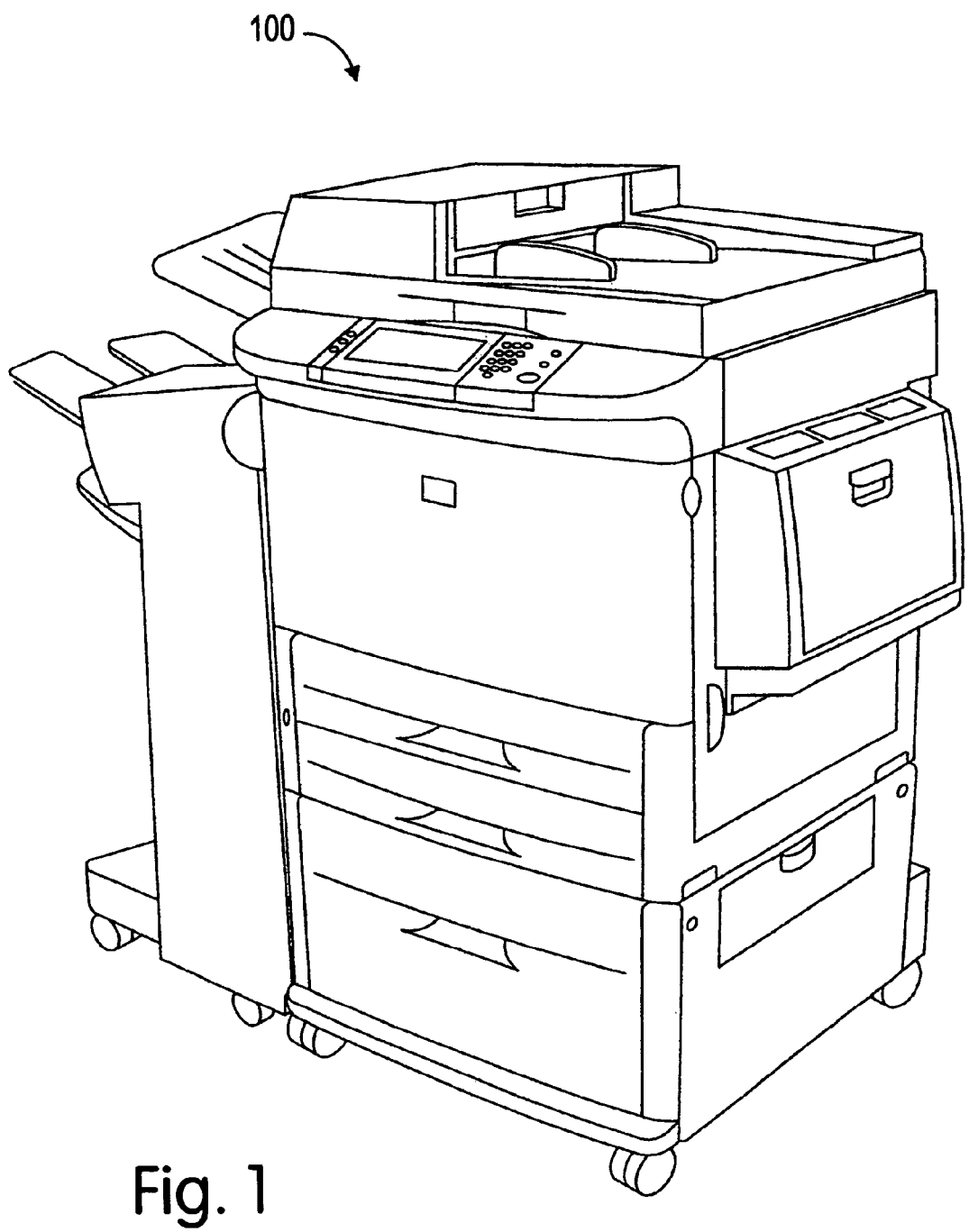
FIG. 1 depicts an exemplary "All-in-One" printing system in which embodiments of the invention may be utilized.

FIG. 1 illustrates an exemplary printing system 100 in which embodiments of the invention may be utilized. Intended for moderately high volume printing, the illustrated system includes multiple other functions and may, for example, be connected to an office network to provide printing, scanning, copying, and faxing capabilities to a workgroup. The exemplary printing system 100 may comprise an electrophotographic or "laser" printer, or may employ another printing technology, such as inkjet. Embodiments of the invention may of course also be utilized in other "All-in-One" systems, such as smaller multifunction systems intended for personal use.

Figure 2:
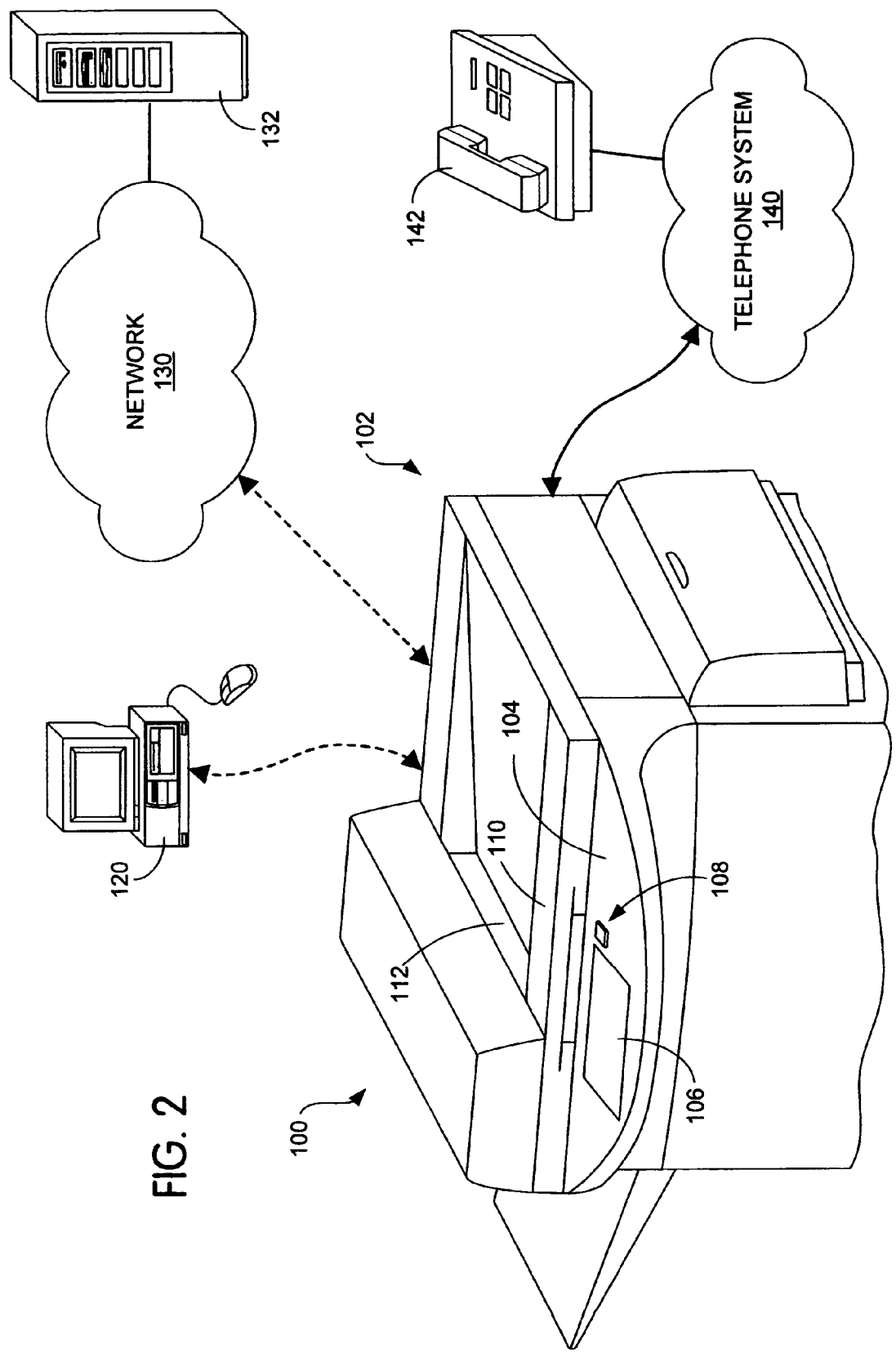
FIG. 2 is a schematic block diagram illustrating how an exemplary "All-in-One" printing system may typically be connected to external devices and systems, including a telephone network for sending and receiving faxes.

FIG. 2 is a schematic block diagram illustrating how an exemplary "All-in-One" printing system 100 may typically be connected to external devices and systems, including a telephone system for sending and receiving faxes. Irrespective of its particular nature, the exemplary printing system 100 includes a control panel 104 that comprises a display 106 with which various screens containing selectable features can be presented to the user. By way of example, the display 106 may comprise a liquid crystal display (LCD) that is touch-sensitive. In addition to the display 106, the control panel 104 may, optionally, include physical controls such as buttons 108.

The exemplary printing system 100 may be connected, either directly or wirelessly, to a local computing device 120, which may comprise a personal computer (PC) or a remote computing device 132, which may comprise a server, via a network 130. As is discussed below, either computing device 120, 132 may serve as a source for selecting fax transmission options. In addition, the local computing device 120 may further provide a means for displaying options to the user. Where used, the network 130 typically comprises one or more sub-networks that are communicatively coupled to each other. By way of example, these networks can include one or more local area networks (LANs) and/or wide area networks (WANs). In some embodiments, the network 130 may comprise a set of networks that forms part of the Internet.

The exemplary All-in-One printing system 100 also provides faxing capabilities, and may be connected to a telephone system 140 to which other fax machines or telephones 142 may also be connected. For scanning, copying, and faxing, the exemplary printing system 100 includes a flatbed scanner which may be accessed by raising a cover 110, or by feeding a document through a paper feeder 112.

Figure 3:
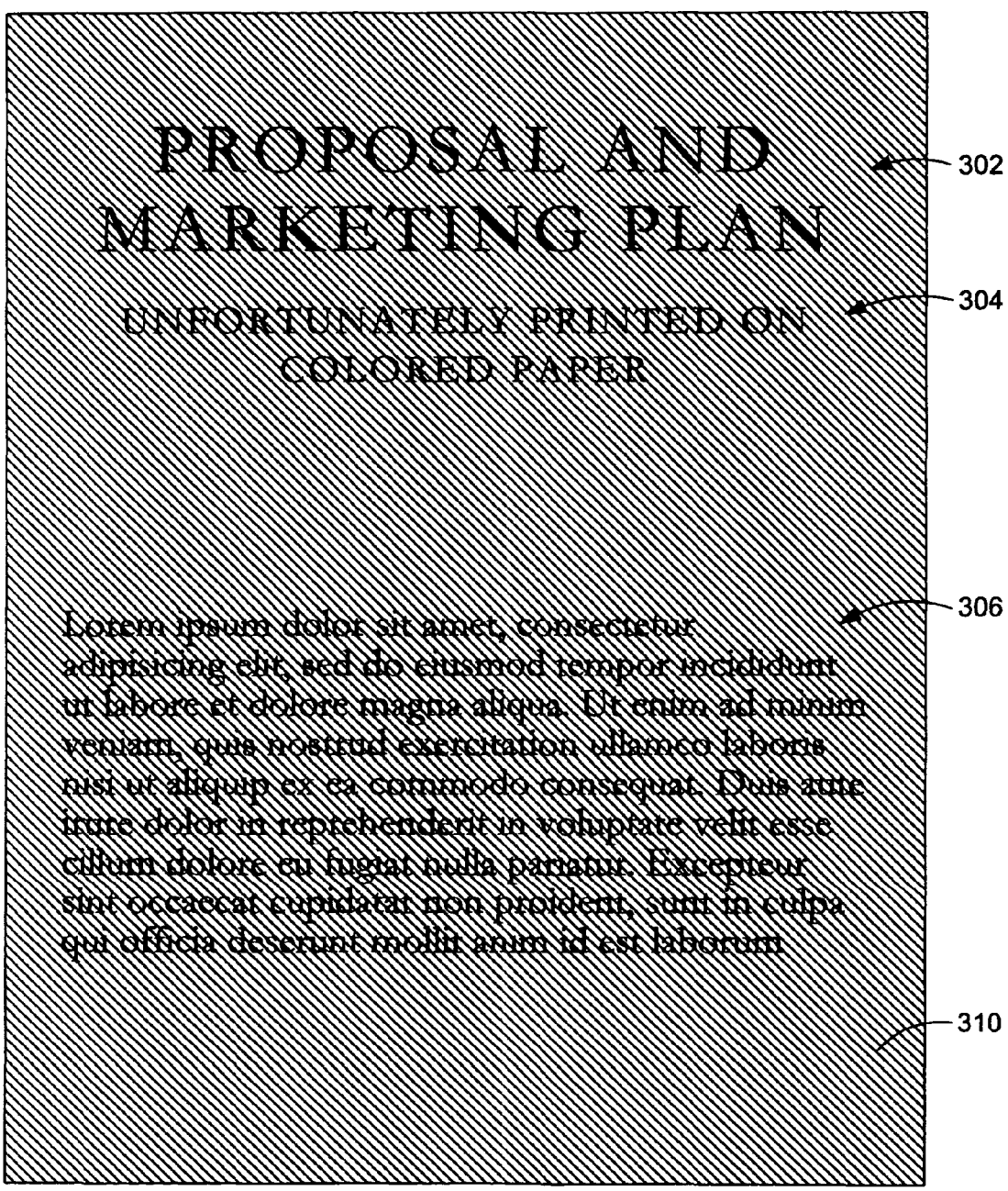
FIG. 3 illustrates an exemplary document printed on colored media.

FIG. 3 illustrates an exemplary document printed on colored media 300. The document for example may comprise areas of text 302, 304, 306 or graphics printed on colored paper 310 (indicated by cross shading). Colored paper may add interest to the original document, but when converted to a low-resolution monochrome image the resultant fax may be of poor quality. Embodiments of the present invention include sensing the presence of colored paper and characterizing the background color, such that the color may essentially be "removed" from the image before faxing, as further discussed below.

Figure 4:
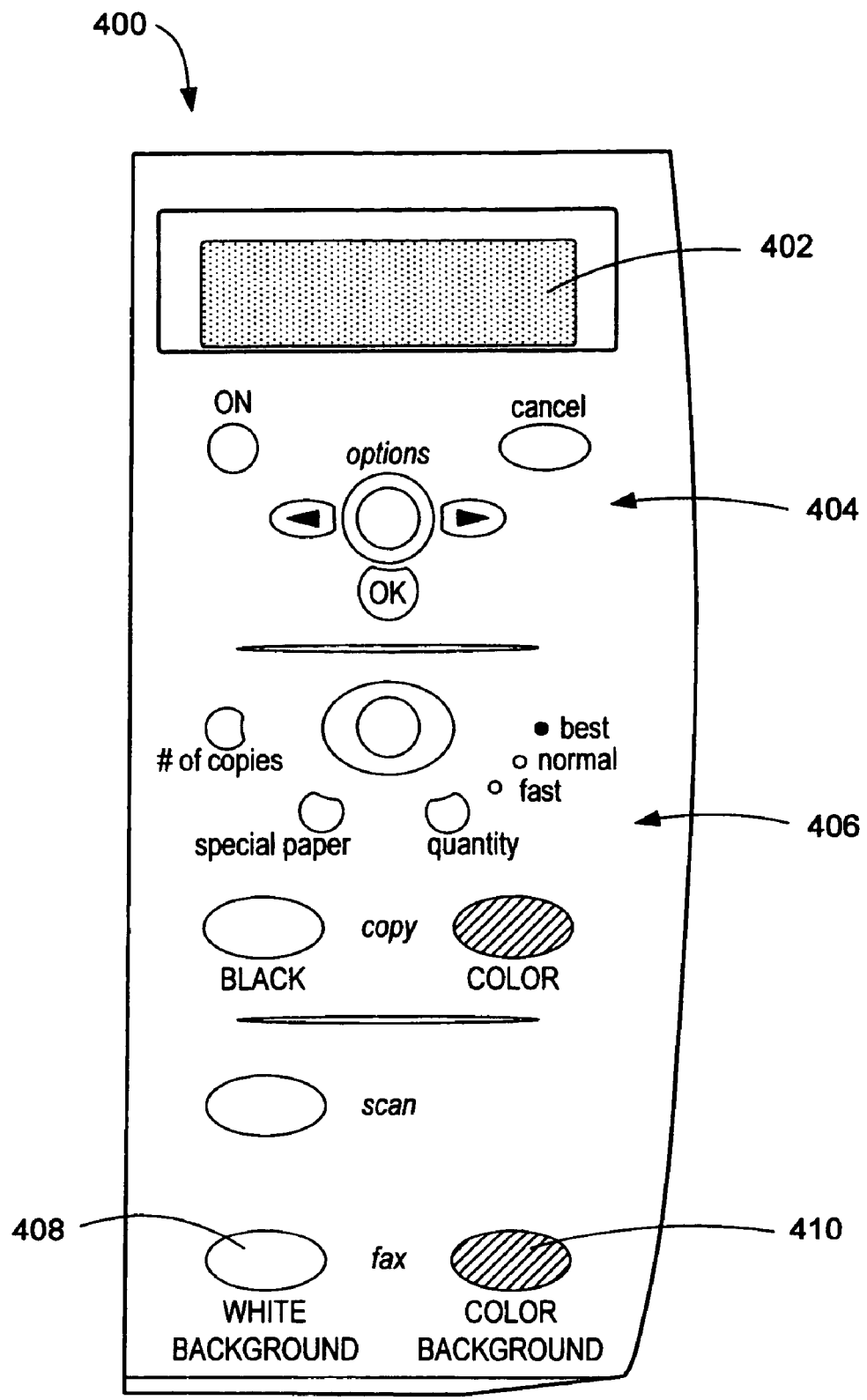
FIG. 4 illustrates an exemplary control panel for an All-in-One printing device incorporating an embodiment of the invention.

FIG. 4 illustrates an exemplary control panel 400 for an All-in-One printing device incorporating an embodiment of the invention. The exemplary panel 400 may include a display 402 for displaying menu options, and an array of buttons 404 for navigating through the menus. The panel may further include dedicated buttons 406 for selecting copy and print options.

Typically, fax machines or mulitifunction machines include a button (either a physical "hardwired" button or a "virtual" button on a touchscreen) which initiates facsimile transmission. One embodiment of the invention includes instead two buttons, one to initiate a fax of documents with a substantially white background 408, and a second to initiate a fax of a document with a substantially solid color background 410. If the user presses the button for white background 408, the facsimile transmission proceeds as a common fax transmission, with the document scanned, converted to audio tones, and transmitted.

If, however, the user presses the button for color background 410, the multifunction device performs a color scan of the document, and uses the color information to detect the background color and to substantially remove the color from the image prior to generating the fax.

By way of example, the document of FIG. 3 may be printed on paper with a red tint. Scanners typically encode color by separating the color into color planes, such as red, green, and blue, and assigning three numerical values to each pixel (R, G, and B). Each pixel may thus include three values: a red value, a green value, and a blue value. The red, green, and blue values for any pixel are each in a range from a minimum pixel value to a maximum pixel value. Typically, the minimum pixel value is equal to 0 and the maximum pixel value is equal to 255 (other ranges are also possible). Thus, each red value is within the range of 0 to 255. Similarly, each green and blue value is within the range of 0 to 255.

A pixel preferably represents "pure white" if its red, green, and blue values are all equal to the maximum pixel value (i.e., 255). A pixel preferably represents "pure black" if its red, green, and blue values are all equal to the minimum pixel value (i.e., 0). Thus, in the sample document of FIG. 3, a red background tint may be indicated by each background pixel having green and blue values less than 255 (for example, a pixel with R, G, and B values of 255, 128, 128, respectively).

In an embodiment of the invention, after a full color scan of the document is performed, firmware or software associated with the multifunction device performs an analysis of the image to determine whether a non-white background color is present, and to establish the approximate value of the background color. The firmware or software may determine the background color based on the predominance and distribution of colors in the scanned image. For example, an algorithm may simply identify that the that no pixels within the body of the page have a value greater than a certain value. The algorithm to determine the background color of the document can take many forms, and may be based on a simple or complex statistical analysis of the document, as is known in the art.

Once an approximate value for the background color is established (e.g., in the illustrative example, R, G, and B values of 255, 128, 128, respectively), the software effectively eliminates the color from the background of the image. In some embodiments of the invention, eliminating the background color may take the form of a simple algorithm that effectively adjusts all pixels of the image by the amount that the determined background color differs from white (e.g., in the example, adding R, G, and B values of 0, 127, 127 to all pixels uniformly, with any results exceeding 255 truncated to 255). In other embodiments, the algorithm to adjust the background color may be more complex, and may include first classifying each pixel as either "background" or "image", and adjusting only the background image. Other algorithms for adjusting the background color of an image are known in the art, and may be utilized by embodiments of the invention.

After the background of the scanned image is adjusted to a substantially "white" value, the adjusted image may be faxed in the same manner as done by existing fax machines or fax software, without the degradation that would occur with existing fax machines or software. In essence, the scanner is used to "calibrate" the fax such that whatever background color is present on the original document becomes "white".

Figure 5:
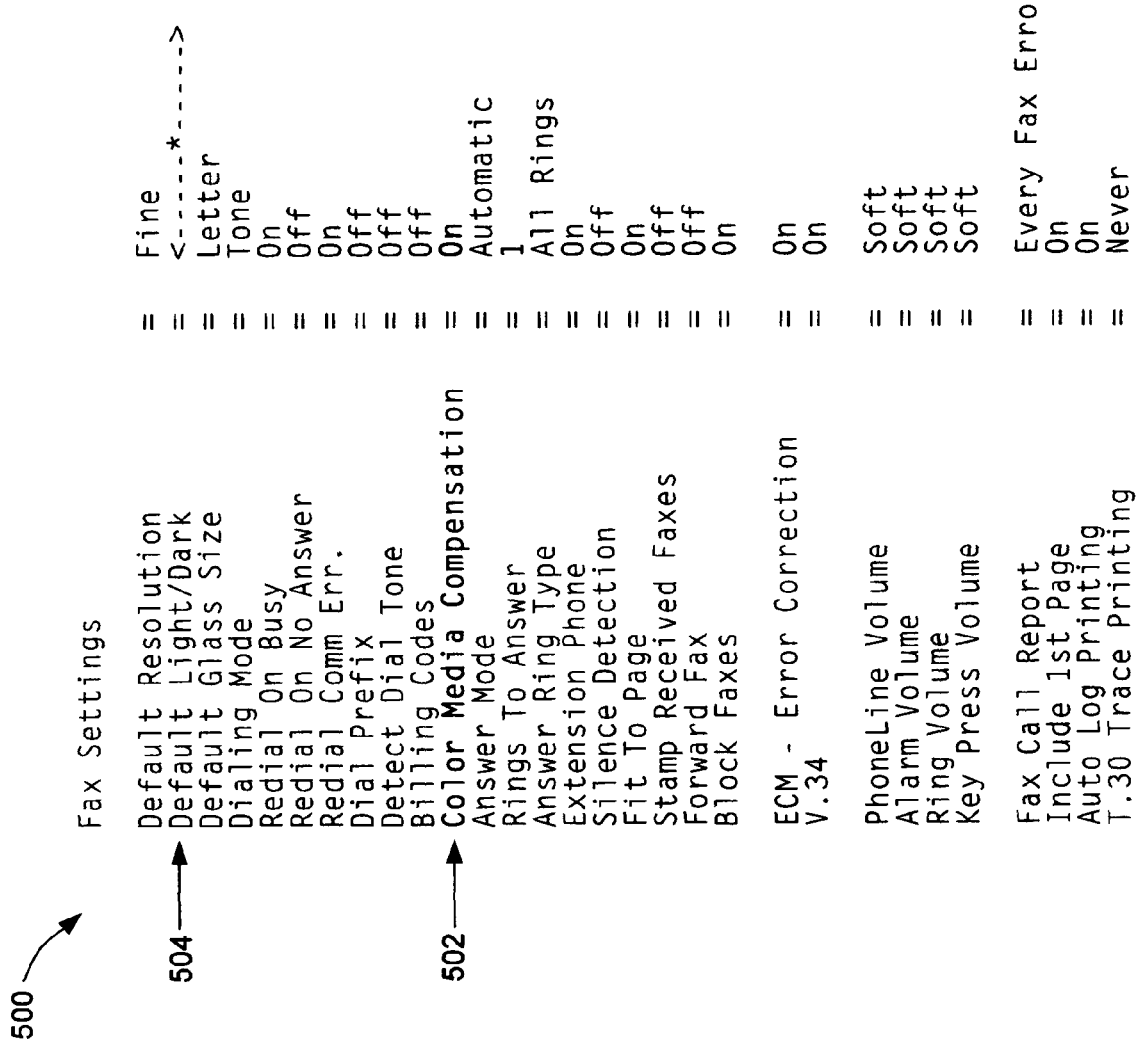
FIG. 5 illustrates an exemplary software or firmware menu for an All-in-One printing device incorporating an embodiment of the invention.

An alternative embodiment to having the physical "color background" button 410 of FIG. 4 is to provide a selectable mode in firmware, such as illustrated in FIG. 5. FIG. 5 shows a "Fax Settings" menu such as may be utilized in an embodiment of the invention. The Fax Settings include settings common to most faxing devices, such as "Default Resolution", "Default Light/Dark", etc. In addition, the menu includes an option to select a "Color Media Compensation" mode, which, when selected, enables an embodiment of the invention. The menu may be presented as part of a "virtual" menu on a front panel display of the multifunction device, such as display 106 of FIG. 2, or may form part of a driver routine residing on an external personal computer 120 or networked computer 132.

Current fax devices may permit some limited adjustment to compensate for colored media, such as the "Default Light/

Dark" setting 504 shown in FIG. 5. Arriving at the correct setting can be laborious, however, and may typically not be an ideal solution, since the Light/Dark setting assumes the document has a neutral color tone. Changing the Default Light/Dark setting can potentially also result in subsequent faxes being sent with incorrect settings, since the current user may not be aware that the default was changed by a previous user. Embodiments of the present invention eliminate the need for manual calibration, and prevent the sending of subsequent faxes with incorrect settings.

FIG. 6 is a flow diagram 600 further summarizing embodiments of the invention. Embodiments of the invention begin 602 by performing a color scan 604 of the original document. From the scanned image, the background color of the original document is determined 606. Once the background color is known, the image is adjusted to effectively remove the background color 608. The adjusted document is then faxed 610, and embodiments of the invention end 612.

Any process steps or blocks in the flow diagram of FIG. 6 may represent modules, segments, or portions of code that include one or more executable instructions for implementing specific logical functions or steps in the process. Although particular example steps are described, alternative implementations are feasible. Moreover, steps may be executed out of order from that shown or discussed, including substantially concurrently or in reverse order, depending on the functionality involved.

Various programs have been described herein. It is to be understood that these programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The disclosed programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

The above is a detailed description of particular embodiments of the invention. It is recognized that departures from the disclosed embodiments may be within the scope of this invention and that obvious modifications will occur to a person skilled in the art. It is the intent of the applicant that the invention include alternative implementations known in the art that perform the same functions as those disclosed. This specification should not be construed to unduly narrow the full scope of protection to which the invention is entitled.

The corresponding structures, materials, acts, and equivalents of all means or step plus function elements in the claims below are intended to include any structure, material, or acts for performing the functions in combination with other claimed elements as specifically claimed.

What is claimed is:

1. In a multifunction printing system having a color document scanner, a method of faxing documents printed on colored paper, comprising:
    scanning an original document to obtain a color scan image;
    analyzing the color scan image to determine a background color characterization for the color scan image based on a predominance and a distribution of colors in the color scan image; and
    modifying the color scan image based on the background color characterization to effectively change the background color to white by:
        differentiating the background color characterization by classifying each pixel in the color scan image as one from a set of a background and an image, and
        adjusting only pixels classified as the background, including adjusting a color of the pixels of the background by an amount that the background color differs from white.

2. The method of faxing documents printed on color paper of claim 1, further comprising transmitting the modified document as a fax document.

3. The method of faxing documents printed on color paper of claim 1, wherein the method is enabled by a hardwired control on the multifunction printing system.

4. The method of faxing documents printed on color paper of claim 1, wherein the method is enabled by selecting an option from a software menu.

5. The method of faxing documents printed on color paper of claim 1, wherein modifying the color scan image comprises adjusting the color values of each pixel in the image by a uniform amount.

6. The method of faxing documents printed on color paper of claim 1, wherein adjusting the color of the pixels of the background includes establishing a color value for the background and uniformly adjusting color values of each of the pixels of the background by an amount that the color value for the background differs from white.

7. The method of faxing documents printed on color paper of claim 6, wherein each of the pixels have red (R), green (G), and blue (B) color values each ranging from a minimum pixel value of zero to a maximum pixel value, and wherein adjusting the color of the pixels of the background includes uniformly adjusting the red (R), green (G), and blue (B) color values of each of the pixels of the background by an amount that the color value for the background differs from the maximum pixel value.

8. The method of faxing documents printed on color paper of claim 7, wherein a pixel represents white when each of the red (R), green (G), and blue (B) color values for the pixel are the maximum pixel value.

9. A multifunction printing system, comprising:
    a color document scanner;
    a telephone line interface for facsimile transmission;
    a first button to initiate faxing of documents with a substantially white background, and a second button to initiate faxing of documents with a color background; and firmware operable to fax documents with the color background when the second button is pressed, the firmware comprising routines to:

scan an original document to obtain a color scan image;

analyze the color scan image to determine a background color characterization for the color scan image based on a predominance and a distribution of colors in the color scan image; and modify the color scan image based on the background color characterization to effectively change the background color to white by:

differentiating the background color characterization by classifying each pixel in the color scan image as one from a set of a background and an image, and adjusting only pixels classified as the background, including adjusting a color of the pixels of the background by an amount that the background color differs from white, wherein the modification of the color scan image is a part of facsimile transmission operations.

10. The multifunction printing system of claim 9, wherein the modified document is transmitted as a fax document.

11. The multifunction printing system of claim 9, wherein faxing of documents is enabled by a hardwired control on the multifunction printing system.

12. The multifunction printing system of claim 9, wherein faxing of documents is enabled by selecting an option from a software menu.

13. The multifunction printing system of claim 9, wherein modifying the color scan image comprises adjusting the color values of each pixel in the image by a uniform amount.

14. The multifunction printing system of claim 9, wherein each of the pixels have red (R), green (G), and blue (B) color values each ranging from a minimum pixel value of zero to a maximum pixel value, wherein a pixel represents white when each of the red (R), green (G), and blue (B) color values for the pixel are the maximum pixel value, and wherein adjusting the color of the pixels of the background includes uniformly adjusting the red (R), green (G), and blue (B) color values of each of the pixels of the background by an amount that a color value for the background differs from the maximum pixel value.

* * * * *